(12) United States Patent
Hoetzel et al.

(10) Patent No.: US 8,024,943 B2
(45) Date of Patent: Sep. 27, 2011

(54) METHOD OF DIVIDING GLASS INTO SEPARATE PIECES WITH THE AID OF A CUTTING LIQUID AND IMPROVED CUTTING LIQUID FOR SAID METHOD

(75) Inventors: Bernd Hoetzel, Woerrstadt (DE); Andreas Habeck, Budenheim (DE); Ortrud Perathoner, Stadecken-Elsheim (DE)

(73) Assignee: Schott AG, Mainz (DE)

( * ) Notice: Subject to any disclaimer, the term of this patent is extended or adjusted under 35 U.S.C. 154(b) by 1295 days.

(21) Appl. No.: 11/434,468

(22) Filed: May 15, 2006

(65) Prior Publication Data

US 2006/0266195 A1  Nov. 30, 2006

(30) Foreign Application Priority Data

May 28, 2005  (DE) .................. 10 2005 024 563

(51) Int. Cl.
  C03C 15/00 (2006.01)
  C03C 23/00 (2006.01)
  D26D 7/08 (2006.01)
(52) U.S. Cl. .................. 65/30.1; 65/31; 83/22
(58) Field of Classification Search ....... 83/22; 65/30.1, 65/31
  See application file for complete search history.

(56) References Cited

U.S. PATENT DOCUMENTS 3,138,610 A * 6/1964 Buc et al. .......... 548/314.7
3,634,243 A * 1/1972 Wessels et al. .......... 508/156
3,819,647 A * 6/1974 Foley .......... 548/350.1
3,827,874 A * 8/1974 Adams .......... 504/156
5,259,888 A * 11/1993 McCoy .......... 134/2
6,086,736 A   7/2000 Dasgupta et al.
6,252,197 B1  6/2001 Hoekstra et al.
6,807,824 B1 * 10/2004 Miwa .......... 65/31
2003/0052098 A1 3/2003 Kim et al.
2004/0219372 A1 11/2004 Ogihara et al.

FOREIGN PATENT DOCUMENTS

FR    2 809 318      11/2001
WO   2004/018144    3/2004

OTHER PUBLICATIONS

Wlkipedia entry for "tetramethylammonium hydroxide" (http://en.wikipedia.org/wiki/Tetramethylammonium_hydroxide) accessed Dec. 22, 2009.*
Xu et. al (Langmuir 2002, 18, 657-600).*
Vautrin et. al. (Colloids and Surfaces A: Physiochem. Eng. Aspects 217 (203) 165-170).*

(Continued)

Primary Examiner — Jason L. Lazorcik
(74) Attorney, Agent, or Firm — Michael J. Striker

(57) ABSTRACT

The method of dividing a glass substrate into separate pieces includes producing a crack along a dividing line on the substrate and acting on the crack with an aqueous cutting liquid during or immediately after producing the crack. The aqueous cutting liquid used in the method has a special composition that reduces the breaking forces applied to the glass substrate in order to divide it. The aqueous liquid contains an ionic organic compound, which has a cation with a positively charged nitrogen atom and a hydroxyl anion. Quaternary ammonium hydroxide compounds are especially preferred as the ionic organic compound.

12 Claims, 4 Drawing Sheets

Example 1 (comparative): Deionized water

Example 2: Hexadecyltrimethylammonium hydroxide, 0.005 wt. % aqueous solution

OTHER PUBLICATIONS

Thies, M., et al: "Multicomponent Diffusion of Distearyldimethylammonium Polyelectrolyte Solutions in the Presence of Salt: Coupled Transport of Sodium Chloride". Journal of Physical Chemistry, American Chemical Society, US, BD. 100, NR. 23, Jan. 1, 1996, pp. 9881-9891, XP009044944, ISSN: 0022-3654.

J.T. L. Thong et al: "TMAN Etching of Silicon and the Interaction of . . ." (Abstract) Sensors and Actuators A: Physical, Feb. 3, 1997 (IN ENG.).

Joseph M. Fedeyko et al: "Understanding the Differences Between Microporous and . . ." Microporous and Mesoporous Materials 90, 2006, pp. 102-111.

Michael Thies et al: "Multicomponent Diffusion of Distearyldimethylammonium . . ." J. Phys. Chem. 1996, 100, pp. 9881-9891.

O Regev et al: "Vesicle—Lammelar Transition Events in . . ." Progr Colloid Polym Sci, 1994, 97, pp. 298-301.

* cited by examiner

Example 1 (comparative): Deionized water

Example 2: Hexadecyltrimethylammonium hydroxide, 0.005 wt. % aqueous solution

Example 3: Hexadecyltrimethylammonium hydroxide,
0.020 wt. % aqueous solution

Example 4: Hexadecyltrimethylammonium hydroxide,
0.040 wt. % aqueous solution

Example 5: Hexadecyltrimethylammonium hydroxide,
0.080 wt. % aqueous solution

Example 6(Comparative): CTAB (Trimethylhexadecylammonium bromide),
0.020 wt. % aqueous solution Example 7(Comparative): CTAB (Trimethylhexadecylammonium bromide), 0.10 wt. % aqueous solution Example 8(Comparative): CTAB (Trimethylhexadecylammonium bromide), 0.40 wt. % aqueous solution

METHOD OF DIVIDING GLASS INTO SEPARATE PIECES WITH THE AID OF A CUTTING LIQUID AND IMPROVED CUTTING LIQUID FOR SAID METHOD

CROSS-REFERENCE

The invention described and claimed hereinbelow is also described in German Patent Application DE 10 2005 024 563.3-45, filed May 28, 2005. This German Patent Application, whose subject matter is incorporated here by reference, provides the basis for a claim of priority of invention under 35 U.S.C. 119 (a)-(d).

BACKGROUND OF THE INVENTION

1. Field of the Invention

The present invention relates to methods of dividing glass into separate pieces using a cutting liquid and to cutting liquids used for that purpose.

2. Related Art

That division of glass into separate pieces is made easier by wetting the crack formed in the glass, e.g. with water, during scribing and breaking of the glass has been known for many years in the glass blowing arts. At the same time water acts as a cooling medium for producing breaking stresses in a glass surface during scribing of the glass by means of a laser, e.g. as described in U.S. Pat. No. 6,252,197. It is already known to add a surfactant to the water, e.g. during laser cutting, (US 2003/0052098 A1) to provide a cooling liquid with improved power to penetrate the scribed line or crack formed by the laser beam. All known classes of wetting agents, i.e. anionic, cationic and nonionic wetting agents, are suitable (WO 2004/018144 A1).

It is especially important to maintain as constant as possible conditions during the dividing of the glass after scribing, when cutting extremely thin glass, e.g. for LCD applications, by means of a laser.

The glass to be divided along the scribed line is heated very rapidly by means of a laser beam during laser cutting in contrast to the scribing methods in which diamond or cutting wheels are used. The heated spots are quenched immediately after heating with the laser beam, generally by spraying the spots with a gas-water mixture. As a result, a crack is formed in the glass because of the large thermal stresses produced during quenching. The glass is broken or divided along the scribed line or crack by application of a force. The force can be applied mechanically, but it is possible to produce still more thermal stresses along the scribed line or crack by additional treatments of the glass with the laser, so that the glass breaks along the scribed line.

SUMMARY OF THE INVENTION

It is an object of the present invention to provide a method of dividing glass using a cutting liquid and also a suitable cutting liquid, in and with which further reductions of the applied breaking force and breaking force fluctuations are possible in an industrial operation.

According to the invention the method of dividing glass comprises the steps of:
a) producing a linear crack in the glass;
b) during or immediately after the producing of the linear crack, applying an aqueous liquid to the linear crack so that the aqueous liquid acts on or attacks the linear crack, the aqueous liquid containing an ionic organic compound, which comprises a cation with a positively charged nitrogen atom and a hydroxyl anion; and
c) dividing or separating the glass along the scribed line by application of a force to the glass.

According to the invention the cutting liquid is an aqueous liquid, which contains an ionic organic compound, which comprises a cation with a positively charged nitrogen atom and a hydroxyl anion.

Lower and more uniform, reproducible breaking forces divide the glass into separate pieces in the method according to the invention, in which an aqueous cutting liquid, which comprises an ionic organic compound with a cation including a positively charged nitrogen atom and a hydroxyl anion, acts on a crack in the glass during or immediately after producing the crack.

A plausible scientific explanation for the outstanding effect of the compounds that were discovered is that the OH⁻ reacts with the broken siloxane bonds in the crack and prevents the spontaneous reaction of the broken bonds with each other (self-healing).

The method and the new cutting liquid used in it are especially suitable for laser cutting methods, in which the crack is formed or the scribing occurs by heating of the glass along the dividing line and immediately after that the heated glass is acted on or attacked by the aqueous liquid (cutting liquid). The crack or gap produced during laser cutting is especially narrow so that self-healing could otherwise be especially great.

The application of the cutting liquid to the crack can occur by all known techniques, e.g. spraying, spraying of a cutting liquid/water mixture, application of a wick, sponge, immersing the crack in the liquid, etc.

Quaternary ammonium hydroxide compounds are especially suitable as the active ingredient of the cutting liquid.

Those quaternary ammonium hydroxide compounds, which are especially suitable, have a cation of the following formula I:

wherein two to three of the R groups each, independently of each other, represent a straight-chained or branched aliphatic group with 1 to 2 carbon atoms, but one to two others of the R groups each independently represent a respective straight-chained or branched aliphatic group with 8 to 18 carbon atoms.

Especially suitable quaternary ammonium hydroxide compounds include dialkyldimethyl ammonium hydroxide compounds, such as distearyldimethylammonium hydroxide, didecyldimethylammonium hydroxide, dimethyldioctylammonium hydroxide, dilauryldimethylammonium hydroxide. Quaternary ammonium hydroxide compounds with three short-chained and one long-chained alkyl group, for example trimethylhexadecylammonium hydroxide, octadecyltrimethylammonium hydroxide and trimethyloctylammonium hydroxide are also especially preferred.

Alkyldimethylbenzylammonium hydroxides with a cation of the following formula II:

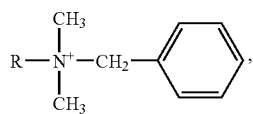

(II)

in which R represents a straight-chained or branched alkyl group with 7 to 17 carbon atom, are also suitable.

Quaternary ammonium compounds with cations of the following generally formula III:

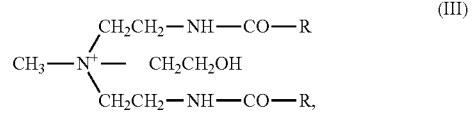

(III)

in which R represents a straight-chained or branched alkyl group with 8 to 18 carbon atoms, are also suitable.

Besides the quaternary ammonium hydroxide compounds imidazoline derivatives with cations of the following general formula IV:

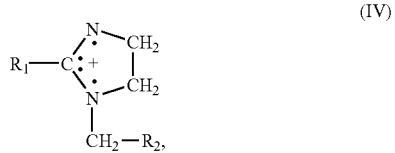

(IV)

in which $R_1$ represents an alkyl or alkylene group with 4 to 20 carbon atoms and $R_2$ represents —$CH_2OH$ or —$CH_2NH$—$COR_3$, wherein $R_3$ denotes an alkyl group with 8 to 18 carbon atoms, are also suitable.

An especially suitable example of an imidazoline derivative is 1-(octylaminoethyl)-2-decyl-3-methyl-imidazolonium hydroxide.

These compounds are contained in the cutting liquid in amounts of from 0.005 to 1 percent by weight. Below 0.005 percent by weight the solution acts like water; above 1% by weight the additive is no longer effective or has a reduced effect. These compounds are preferably contained in the cutting liquid in amounts of from 0.02 to 0.1 percent by weight, since good action is combined with reduced chemical consumption when amounts in this concentration range are employed. Mixtures of these compounds can understandably also be employed.

In the event that it is necessary the cutting liquid can contain still other solvating agents for the compounds used. These solvating agents can include low molecular weight alcohols, such as methanol, ethanol, propanol and butanol in amounts of up to 80% by volume of the cutting liquid. Other additives, such as thickeners, corrosion inhibitors, bactericides can be added as needed.

The cutting liquid not only makes the dividing of the glass into pieces by laser action easier, but also makes conventional glass cutting, for example by scribing with a diamond or by cutting with a cutting wheel easier. It is especially suitable for cutting of sensitive objects, e.g. thin glass substrates for TFT display screens, and makes the breaking forces used in these methods smaller and more uniform.

A special advantage of the method and discovered cutting liquids of the present invention is that scarcely any troublesome anions are present, which could interfere with further processing of the separated glass pieces in later working steps.

BRIEF DESCRIPTION OF THE DRAWING

The objects, features and advantages of the invention will now be illustrated in more detail with the aid of the following examples, with reference to the accompanying figures in which.

EXAMPLE

The breaking forces and their reproducibility for embodiments of the method of dividing glass into separate pieces according to the invention and according to the prior art were tested. The cutting liquids of the invention were used to divide glass plates by means of the method according to the invention, while the cutting liquids of the prior art were used to divide equivalent glass plates using a comparable test method.

Glass plates of dimensions of 25 mm×150 mm with a thickness of 0.7 mm were manufactured by means of a laser cutting machine, Type DLC 1200/Blue of Schott Advanced Processing. A transverse crack, which had a depth of about 115 μm, was centrally scribed at 75 mm on each of the glass plates to be broken during testing. During the laser scribing to form a crack the glass plates were acted on with a mixture of 6 ml/min cutting liquid and 40 l/min of air, immediately following behind the laser focal spot. The plates were dried after the scribing or crack formation. The glass plates were supported over a 10 mm section on both small sides, with the crack facing downward. Subsequently the glass plates were loaded from above until they broke along their cracks.

About 30 equivalent test plates were broken in this manner for each cutting fluid tested. The cutting liquid used in comparative example 1 was water. The cutting liquids of the invention used in examples 2 to 5 were aqueous solutions of hexadecyltrimethylammonium hydroxide in different concentrations, as stated on FIGS. 2 to 5. The prior art cutting liquids of comparative examples 6 to 8 were aqueous solutions of cetyltrimethylammonium bromide (CTAB) in different concentrations, as stated on the FIGS. 6 to 8.

Figure 1:
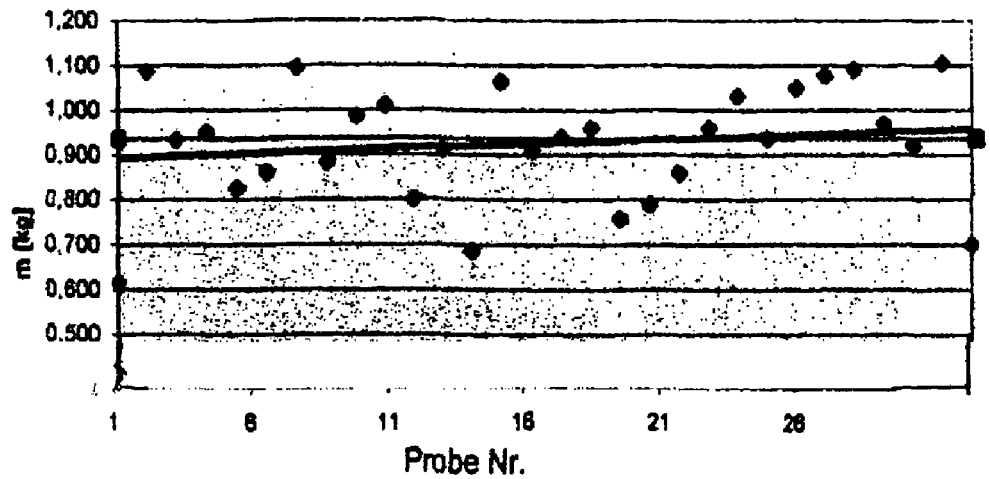
FIGS. 1 to 8 are respective graphical illustrations showing the size and variation of breaking forces required to divide equivalent test glass plates according to the method of the present invention using an example of the cutting liquid according to the invention as well as of breaking forces required to divide test glass plates according to various prior art methods.
Figure 2:
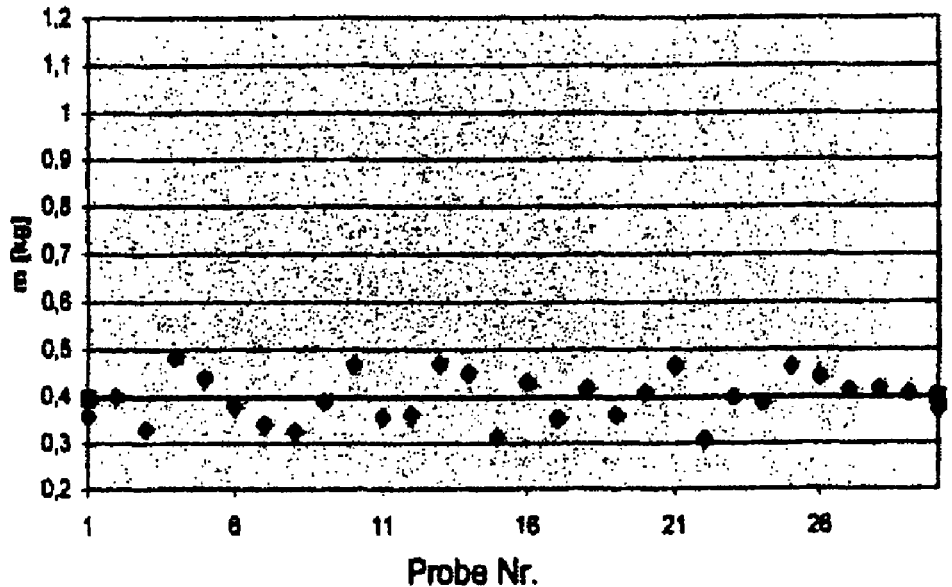
Figure 3:
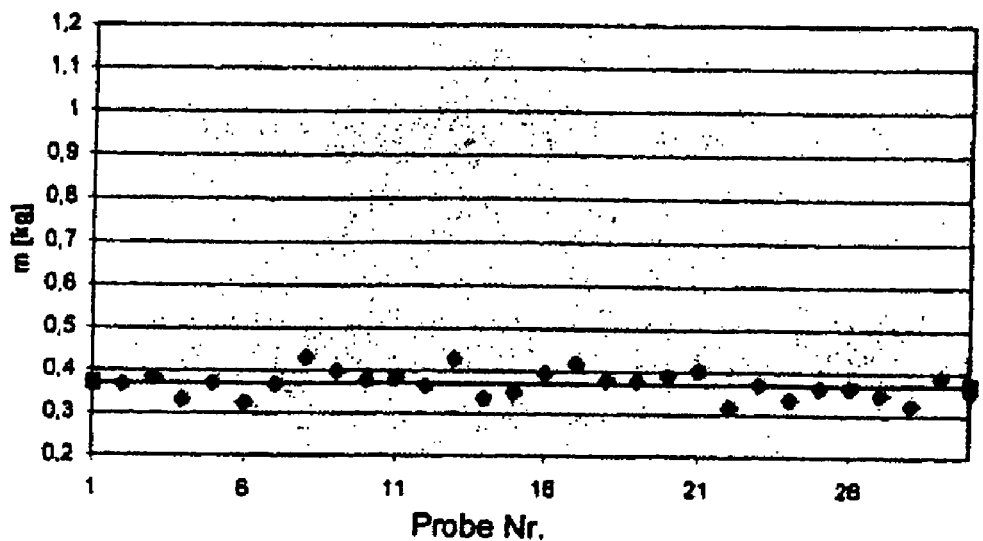
Figure 4:
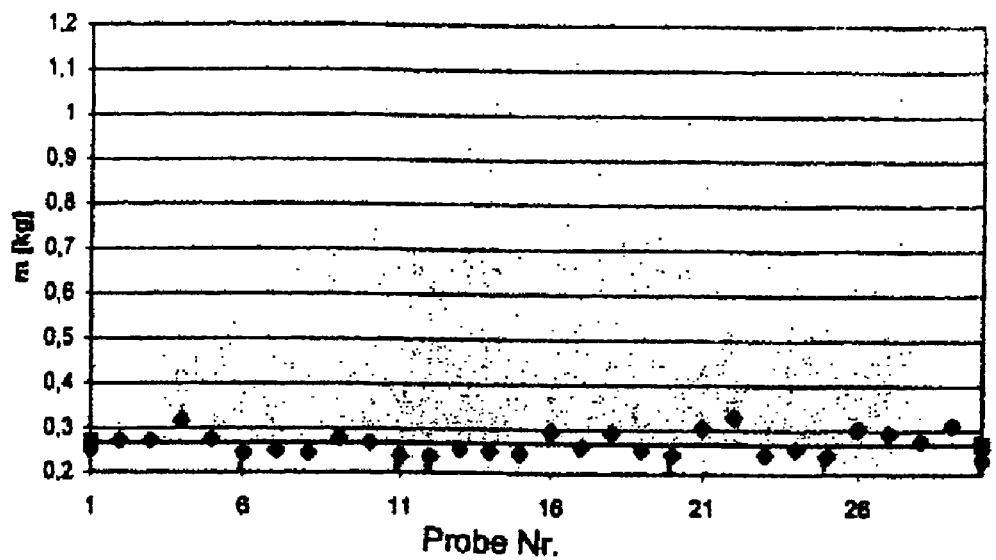
Figure 5:
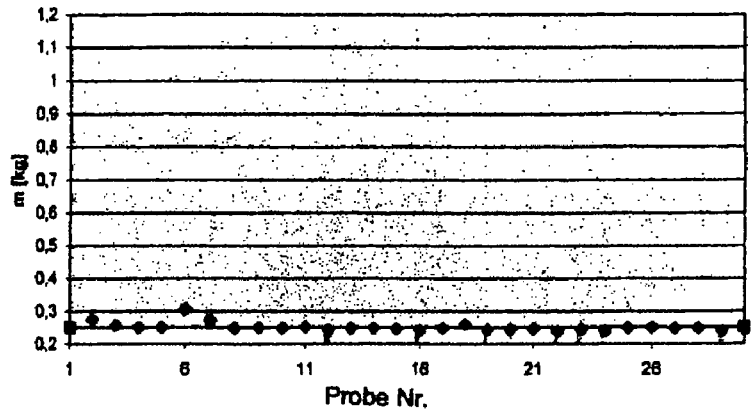
Figure 6:
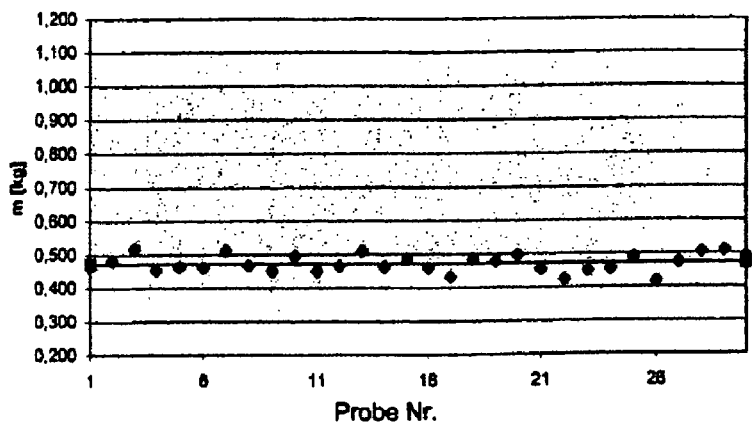
Figure 7:
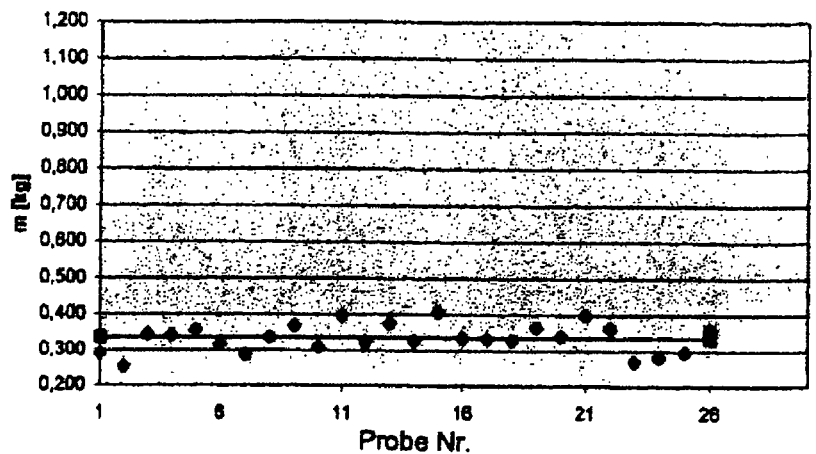
Figure 8:
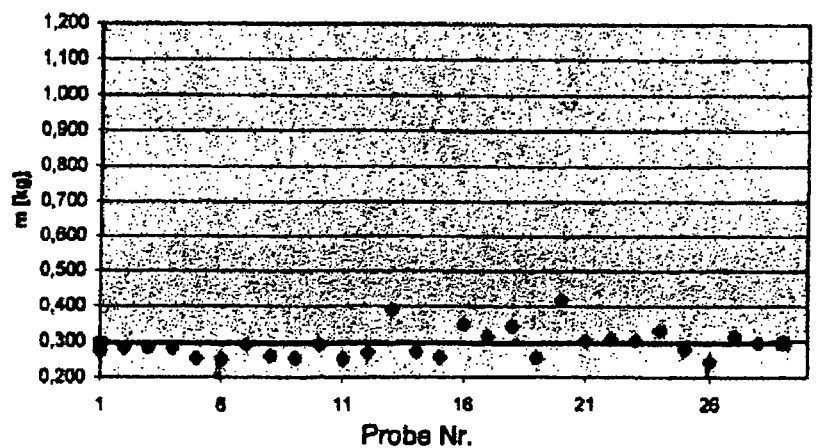

FIGS. 1 to 8 are respective graphical illustrations showing the force required to break each tested glass plate along its crack by a method using corresponding cutting liquids as set forth in the above paragraphs. FIGS. 2 to 5 show the breaking forces required to break the tested glass plates by the method according to the invention using the cutting liquid of examples 2 to 5. The FIG. 1 shows the breaking forces required to break the tested glass plates using water as the cutting liquid and FIGS. 6 to 8 show the breaking forces required to break the tested glass plates using the CTAB cutting liquid solutions.

The diamond points shown in the figures give the individual measured breaking force (in kg read off the Y axis) for a particular test sample (designated by probe no. on the X axis). The square point on each figure gives the average value of the breaking force for all test samples. A line is shown on each figure drawn through the diamond points.

The test results shown in the figures clearly show that the methods using the cutting liquids according to the invention clearly have superior properties to those using the cutting liquids according to the prior art. Particularly they show that the breaking forces required to break the test plates along their cracks are considerably smaller and fluctuate or vary much less when the cutting liquids according to the invention are used instead of those of the prior art. Thus the cutting forces are more reproducible using the cutting liquids of the invention.

While the invention has been illustrated and described as embodied in a method of dividing glass into separate pieces using a cutting liquid and an improved cutting liquid for use in the method, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of dividing glass into separate pieces, said method comprising the steps of:
   a) producing a linear crack in the glass;
   b) during or immediately after the producing of the linear crack, applying an aqueous liquid to the linear crack, wherein said aqueous liquid acts on or attacks the linear crack to reduce breaking force and breaking force fluctuations encountered when dividing or separating the glass along said linear crack and said aqueous liquid contains hexadecyltrimethylammonium hydroxide; and
   c) dividing or separating the glass along the linear crack by application of a force to the glass to form said pieces.

2. The method as defined in claim 1, wherein the crack in the glass is produced by heating the glass along a dividing line on the glass and acting with said aqueous liquid on the crack immediately after the heating.

3. The method as defined in claim 2, wherein the heating of the glass along the dividing line occurs by means of a laser beam.

4. The method as defined in claim 1, wherein said aqueous liquid contains said hexadecyltrimethylammonium hydroxide in an amount that is effective in reducing said breaking force and said breaking force fluctuations, said amount being in a range of 0.005 to 1 percent by weight.

5. The method as defined in claim 1, wherein said amount of said hexadecyltrimethylammonium hydroxide is from 0.02 to 0.1 percent by weight.

6. A method of dividing glass into separate pieces, said method comprising the steps of:
   a) producing a linear crack in the glass;
   b) during or immediately after the producing of the linear crack, applying an aqueous liquid to the linear crack, wherein said aqueous liquid acts on or attacks the linear crack to reduce breaking force and breaking force fluctuations encountered when dividing or separating the glass along said linear crack and said aqueous liquid contains at least one least one ionic organic compound in an amount that is effective for reducing the breaking force and the breaking force fluctuations, said at least one least one ionic organic compound being selected from the group consisting of hexadecyltrimethylammonium hydroxide, octadecyl-trimethylammonium hydroxide and trimethyloctylammonium hydroxide; and
   c) dividing or separating the glass along the linear crack by application of a force to the glass to form said pieces.

7. The method as defined in claim 6, wherein the crack in the glass is produced by heating the glass by means of a laser beam along a dividing line on the glass and acting with said aqueous liquid on the crack immediately after the heating.

8. The method as defined in claim 6, wherein said amount is from 0.005 to 1 percent by weight.

9. A method of dividing glass into separate pieces, said method comprising the steps of:
   a) producing a linear crack in the glass;
   b) during or immediately after the producing of the linear crack, applying an aqueous liquid to the linear crack, wherein said aqueous liquid acts on or attacks the linear crack to reduce breaking force and breaking force fluctuations encountered when dividing or separating the glass along said linear crack and said aqueous liquid contains at least one least one ionic organic compound in an amount that is effective for reducing the breaking force and the breaking force fluctuations; and
   c) dividing or separating the glass along the linear crack by application of a force to the glass to form said pieces; and
   wherein said at least one least one ionic organic compound being selected from the group consisting of
   (a') quaternary ammonium hydroxide compounds each having a cation of formula I:

wherein two to three of the R groups each, independently of each other, represent a straight-chained or branched aliphatic group with 1 to 2 carbon atoms, but one to two others of the R groups each independently represent a respective straight-chained or branched aliphatic group with 8 to 18 carbon atoms;
   (b') alkyldimethylbenzylammonium hydroxide compounds each with a cation of formula II:

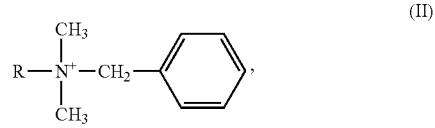

in which R represents a straight-chained or branched alkyl group with 7 to 17 carbon atoms;
   (c') quaternary ammonium compounds each with a cation of formula III:

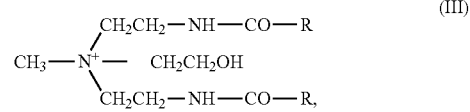

in which R represents a straight-chained or branched alkyl group with 8 to 18 carbon atoms; and (d') imidazoline derivatives each with a cation of formula IV:

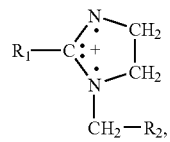

in which $R_1$ represents an alkyl or alkylene group with 4 to 20 carbon atoms and $R_2$ represents —$CH_2OH$ or —$CH_2NH$—$COR_3$, wherein $R_3$ denotes an alkyl group with 8 to 18 carbon atoms.

10. The method as defined in claim 9, wherein the crack in the glass is produced by heating the glass along a dividing line on the glass and acting with said aqueous liquid on the crack immediately after the heating.

11. The method as defined in claim 10, wherein the heating of the glass along the dividing line occurs by means of a laser beam.

12. The method as defined in claim 9, wherein said amount is from 0.005 to 1 percent by weight.

* * * * *